(12) United States Patent
Gormley

(10) Patent No.: US 11,286,879 B2
(45) Date of Patent: Mar. 29, 2022

(54) TARGET DOOR REVERSER WITH NON-PARALLEL HINGE LINES

(71) Applicant: ROHR, INC., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 416 days.

(21) Appl. No.: 16/025,239

(22) Filed: Jul. 2, 2018

(65) Prior Publication Data

US 2020/0003152 A1 Jan. 2, 2020

(51) Int. Cl.
*F02K 1/00* (2006.01)
*F02K 1/60* (2006.01)
*F02K 1/76* (2006.01)

(52) U.S. Cl.
CPC ............... *F02K 1/60* (2013.01); *F02K 1/763* (2013.01); *F05D 2260/50* (2013.01)

(58) Field of Classification Search
CPC ..... F02K 1/72; F02K 1/70; F02K 1/76; F02K 1/605; F02K 1/62; F02K 1/625; F05B 2250/34; F05B 2250/314
See application file for complete search history.

(56) References Cited

U.S. PATENT DOCUMENTS

| | | | |
|---|---|---|---|
| 3,097,484 A | 7/1963 | André et al. | |
| 4,422,605 A * | 12/1983 | Fage | F02K 1/766 239/265.29 |
| 5,117,630 A * | 6/1992 | Cariola | B64D 33/04 244/11 OB |
| 5,775,097 A | 7/1998 | Lardy et al. | |
| 5,779,192 A * | 7/1998 | Metezeau | F02K 1/60 239/265.29 |
| 5,819,527 A | 10/1998 | Fournier | |
| 6,256,979 B1 * | 7/2001 | Fournier | F02K 1/60 239/265.37 |
| 8,015,797 B2 | 9/2011 | Lair | |
| 8,434,715 B2 | 5/2013 | Lair | |
| 2002/0184874 A1 * | 12/2002 | Modglin | F02K 1/625 60/226.1 |
| 2013/0056554 A1 * | 3/2013 | Guillois | F02K 1/60 239/265.19 |

(Continued)

FOREIGN PATENT DOCUMENTS

EP 1903205 3/2008

OTHER PUBLICATIONS

European Patent Office, European Search Report dated Feb. 17, 2020 in Application No. 19180954.0.

(Continued)

*Primary Examiner* — Edwin Kang
(74) *Attorney, Agent, or Firm* — Snell & Wilmer L.L.P.

(57) ABSTRACT

The present disclosure provides a thrust reverser comprising a stationary structure defining an annular body with a centerline, a first reverser door pivotally coupled to the stationary structure by a pair of first reverser door hinges, a first reverser door hinge axis extending through the first reverser door hinges and positioned at a first angle relative to a centerline, and a second reverser door pivotally coupled to the stationary structure by a pair of second reverser door hinges, a second hinge line axis extending through the second reverser door hinges and positioned at a second angle relative to the centerline.

20 Claims, 6 Drawing Sheets

(56) References Cited

U.S. PATENT DOCUMENTS

2013/0097998 A1* 4/2013 Marche .................... F02K 1/70
  60/226.2
2015/0291289 A1  10/2015 Chandler
2019/0063367 A1* 2/2019 Smith .................... F02K 1/763

OTHER PUBLICATIONS

European Patent Office, European Search Report dated Nov. 21, 2019 in Application No. 19180954.0.
European Patent Office, European Office Action dated Dec. 2, 2020 in Application No. 19180954.0.

* cited by examiner

TARGET DOOR REVERSER WITH NON-PARALLEL HINGE LINES

FIELD OF THE DISCLOSURE

The present disclosure relates to aircraft thrust reversers used with gas turbine engines, and more particularly, target door thrust reversers.

BACKGROUND OF THE DISCLOSURE

Thrust reversers may be deployed in order to reverse a direction of thrust produced by a gas turbine engine, which can help slow an associated aircraft during landing and rejected takeoffs (RTOs). Certain embodiments of thrust reverser systems may utilize rotating components which may rotate to redirect the direction of thrust. Said components, namely doors, are somewhat limited with respect to the positioning of the hinges since certain positioning can result in a clash between said doors and/or with fixed structure. To resolve the aforementioned clash, the doors should be separated resulting in thrust reverser inefficiency.

SUMMARY OF THE DISCLOSURE

A thrust reverser may comprise a stationary structure defining an annular body with a centerline, a first reverser door pivotally coupled to the stationary structure by a pair of first reverser door hinges, a first reverser door hinge axis extending through the pair of first reverser door hinges, a first reverser door hinge axis positioned at a first angle relative to the centerline, and a second reverser door pivotally coupled to the stationary structure by a pair of second reverser door hinges, a second reverser door hinge axis extending through the pair of second reverser door hinges and positioned at a second angle relative to the centerline.

In various embodiments, the pair of first reverser door hinges and the pair of second reverser door hinges may be offset an equal distance from the centerline. The pair of first reverser door hinges and the pair of second reverser door hinges may be offset from the centerline in an opposite direction, the pair of first reverser door hinges offset from the centerline by a first distance and the pair of second reverser door hinges offset from the centerline by a second distance. The first reverser door may be configured to rotate about the pair of first reverser door hinges and the second reverser door may be configured to rotate about the pair of second reverser door hinges in an opposite direction as the first reverser door. The first reverser door and the second reverser door may be configured to redirect the direction of thrust from a gas turbine engine when the thrust reverser is in a deployed configuration. The thrust reverser may further comprise a first actuator coupled to a frame and the first reverser door and a second actuator coupled to the frame and the second reverser door. The first angle and the second angle may be between approximately 80 and 100 degrees. The thrust reverser may be radially tapered from an axially forward portion to an axially aft portion when the thrust reverser is in a stowed configuration. The first actuator and second actuator may be configured to extend to position the thrust reverser in a deployed configuration and configured to retract to position the thrust reverser in a stowed configuration.

A thrust reverser may comprise a frame a first reverser door being rotatable relative to the frame and a second reverser door being rotatable relative to the frame, wherein the first reverser door rotates about a first reverser door hinge axis angled at a first angle with respect to a centerline of the thrust reverser and the second reverser door rotates about a second reverser door hinge axis angled at a second angle with respect to the centerline of the thrust reverser, the first angle being greater than the second angle.

In various embodiments, the first reverser door rotates in an opposite direction from the second reverser door. The thrust reverser may further comprise a first plane extending through a length of the first reverser door hinge axis, the first plane being offset from the centerline by a first distance. The thrust reverser may further comprise a second plane extending through a length of the second reverser door hinge axis, the second plane being offset from the centerline by a second distance. The first plane and the second plane may be parallel. The first distance and the second distance may be equal. The first reverser door hinge axis may be axially aft of the second reverser door hinge axis. The second reverser door hinge axis may be axially aft of the first reverser door hinge axis.

A method of manufacturing a thrust reverser may comprise forming a first reverser door, a pair of first reverser door hinges, second reverser door, a pair of second reverser door hinges, and frame, coupling the pair of first reverser door hinges to the frame at a first angle relative to a centerline, coupling the pair of second reverser door hinges to the frame at a second angle relative to the centerline, coupling the first reverser door to the pair of first reverser door hinges, and coupling the second reverser door to the pair of second reverser door hinges.

In various embodiments, coupling the pair of first reverser door hinges to the frame may comprise offsetting the pair of first reverser door hinges a first distance from the centerline. Coupling the pair of second reverser door hinges to the frame may comprise offsetting the pair of second reverser door hinges a second distance from the centerline, the second distance being opposite in direction and equal to the first distance.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with aircraft thrust reverser systems. However, various aspects of the disclosed embodiments may be adapted for performance in a variety of other systems. As such, numerous applications of the present disclosure may be realized.

Figure 1:
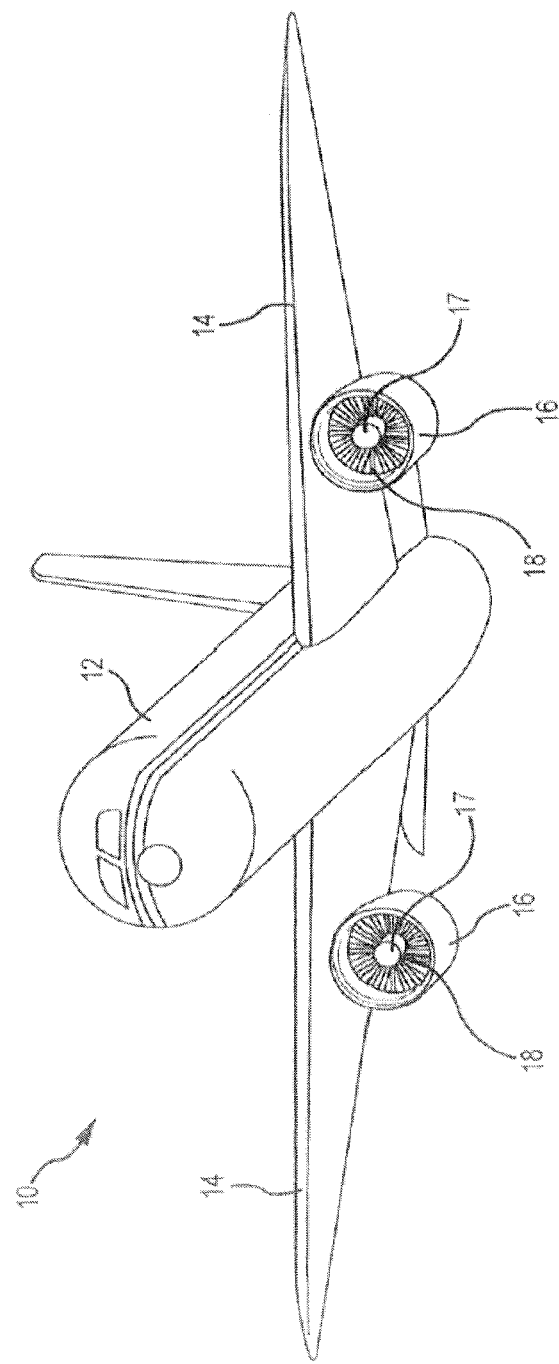
FIG. 1 illustrates an aircraft having a gas turbine engine comprising a thrust reverser, in accordance with various embodiments.

In various embodiments and with reference to FIG. 1, an aircraft 10 may comprise a fuselage 12 and a pair of wings 14. Propulsion system 16 (e.g., turbofan jet engine with a nacelle assembly) may be mounted on the underside of wing 14. Propulsion system 16 may comprise a fan 18 and an engine core 17. Engine core 17 may be configured to drive the fan 18 and provide forward and/or reverse thrust and/or propulsion for aircraft 10. In various embodiments, propulsion system 16 may be mounted on an aircraft fuselage.

Figure 2:
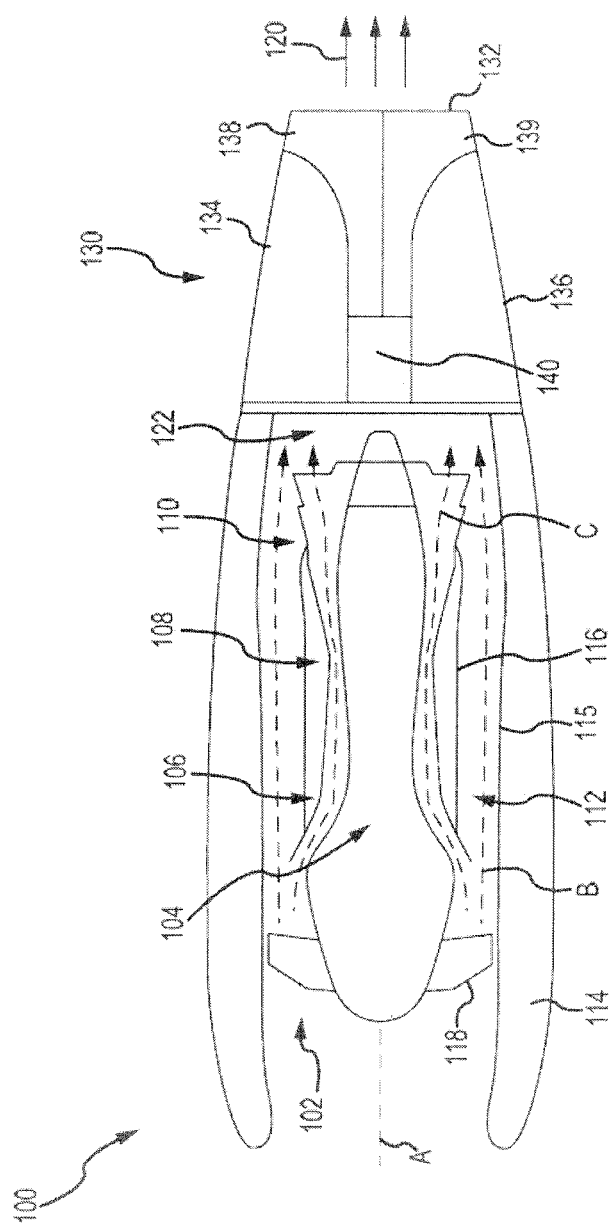
FIG. 2 illustrates a cross-sectional view of a gas turbine engine, in accordance with various embodiments.

Referring now to FIG. 2, propulsion system 16 is illustrated in the form of a gas turbine engine 100 of a mixed flow turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the high speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a stowed position (also referred to as a closed position or a retracted position), as illustrated in FIG. 2. The thrust reverser 130 further includes an upper reverser door 134, a lower reverser door 136, an upper nacelle 138, a lower nacelle 139, and a frame 140, which may house actuator componentry and connecting members used to open and close the upper reverser door 134 and the lower reverser door 136. As discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 exiting the thrust reverser 130 while in an open or deployed position provides the reverse thrust used to decelerate an aircraft upon landing or during a rejected takeoff.

Figure 3A:
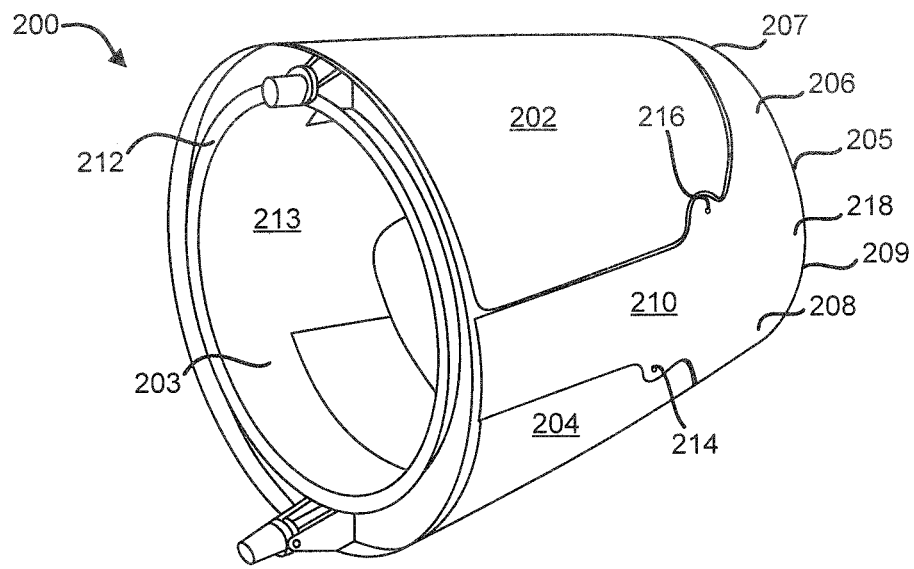
FIGS. 3A and 3B illustrate front perspective views of a thrust reverser assembly, in accordance with various embodiments.
Figure 3B:
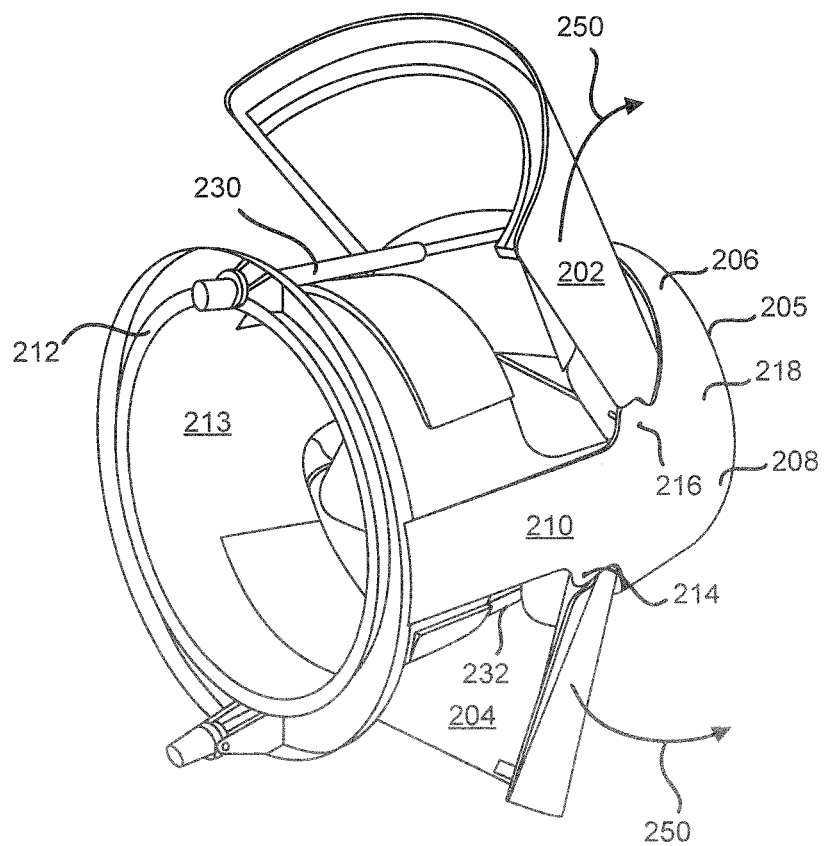

Referring now to FIGS. 3A and 3B, front perspective views of a thrust reverser 200 in a stowed position and a deployed position, respectively, are illustrated, in accordance with various embodiments. Thrust reverser 200 may be similar to thrust reverser 130 (with momentary reference to FIG. 2) such that thrust reverser 200 may form a portion of a nacelle and be configured to provide reverse thrust for a gas turbine engine. The thrust reverser 200 includes an upper reverser door 202, a lower reverser door 204, an upper nacelle 206 defining an upper trailing edge 207, a lower nacelle 208 defining a lower trailing edge 209, and a frame 212. In various embodiments, upper nacelle 206 and lower nacelle 208 may form a portion of stationary structure 210. Stationary structure 210 may be configured to remain in a stationary position while upper reverser door 202 and lower reverser door rotate during activation of the thrust reversing system. In various embodiments, upper nacelle 206 and lower nacelle 208 may form an annular body 218 at an aft portion of thrust reverser 200. Annular body 218 may define an exhaust duct 205 at a radially inner surface of annular body 218. In various embodiments, upper nacelle 206 and lower nacelle 208 may be common to and rotate as part of the upper reverser door 202 and lower reverser door 204, respectively. In other words, in various embodiments, upper reverser door 202 and lower reverser door 204 may form, in part, the nozzle 205 in the stowed position.

In various embodiments, the frame 212 includes an annular structure 213 coupled with a first actuator 230 and a second actuator 232. First actuator 230 and second actuator 232 may be coupled on a first end to frame 212 and coupled on a second end to a radially inner portion of upper reverser door 202 and lower reverser door 204, respectively. Upon extension of first actuator 230 and second actuator 232, upper reverser door 202 and lower reverser door 204 may rotate in opposite directions towards an aft portion of thrust reverser 200, as indicated by arrows 250. Upper reverser door 202 may rotate about upper reverser door hinge 216 while lower reverser door 204 may rotate about lower reverser door hinges 214. The process may be reversed by retraction of first actuator 230 and second actuator 232 such that upper reverser door 202 and lower reverser door 204 rotate towards a forward portion of thrust reverser 200. In this manner, thrust reverser 200 may transition from a stowed configuration to a deployed configuration and revert back to a stowed configuration. First actuator 230 and second actuator 232 may be any suitable actuation system and may be positioned at any radial position along frame 212 of thrust reverser 200.

Figure 4A:
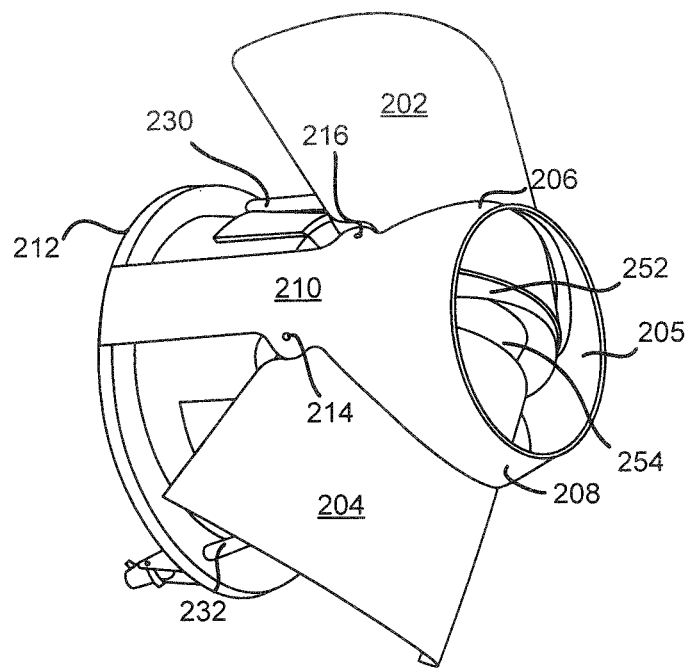
FIGS. 4A and 4B illustrate aft perspective views of a thrust reverser assembly, in accordance with various embodiments.
Figure 4B:
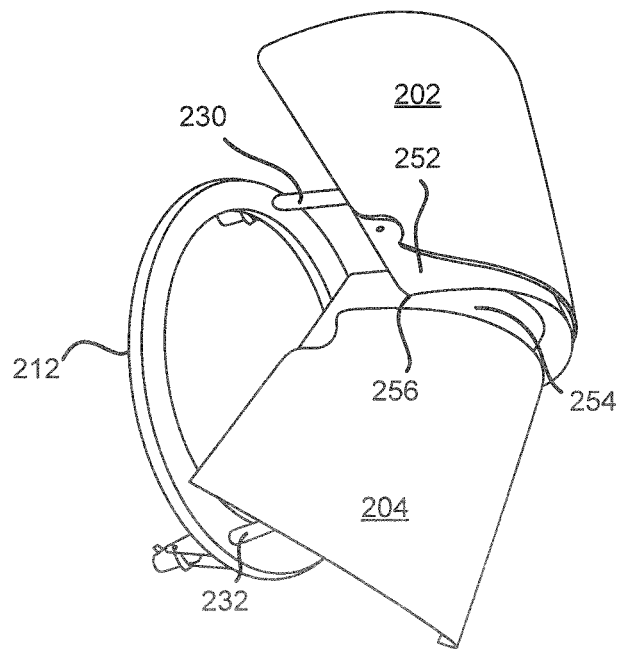

Moving on and with reference to FIGS. 4A and 4B, thrust reverser 200 is illustrated in an aft perspective view in a deployed configuration, in accordance with various embodiments. In various embodiments, upper reverser door 202 and lower reverser door 204 of thrust reverser 200 may be positioned such that the aft portions of upper reverser door 202 and lower reverser door 204 do not contact when thrust reverser 200 is in a deployed configuration. For example, referring first to FIG. 4A, upper reverser door 202 may comprise a upper reverser door recessed portion 252 at an aft position of upper reverser door 202. Upper reverser door recessed portion 252 may be structured such that upper reverser door recessed portion 252 is positioned radially inward of the remaining portions of upper reverser door 202 while thrust reverser 200 is in a stowed configuration. While thrust reverser 200 is in a stowed configuration, a radially outer portion of upper reverser door recessed portion 252 may be positioned adjacent to a radially inward portion of upper nacelle 206. In this way, a radially outer surface of upper reverser door 202 and a radial outer surface of upper nacelle 206 may be flush when thrust reverser 200 is in a stowed configuration. Similarly, lower reverser door 204 may comprise a lower door recessed portion 254 at an aft location such that lower reverser door 204 interacts with lower nacelle 208 in a similar manner.

Referring now to FIG. 4B, thrust reverser 200 is illustrated from an aft perspective in a deployed configuration without stationary structure 210, in accordance with various embodiments. As can be seen, upper reverser door recessed portion 252 may overlap lower door recessed portion 254 in a deployed configuration such that upper reverser door recessed portion 252 and lower door recessed portion 254 do not interfere and contact each other (for example, at contact point 256). Parallel thrust reverser door hinge lines may result in interfering thrust reverser doors, which may adversely affect reverse thrust efficiency.

Figure 5A:
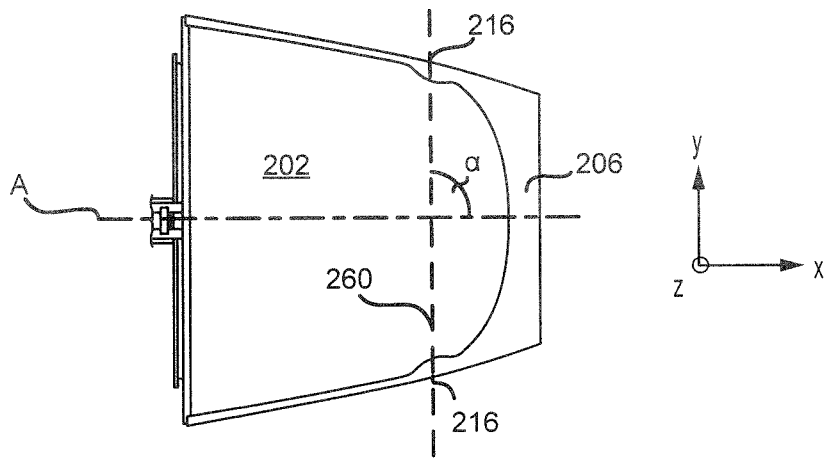
FIGS. 5A, 5B, and 5C illustrate a top view, a bottom view, and a side view of a thrust reverser assembly, in accordance with various embodiments.
Figure 5B:
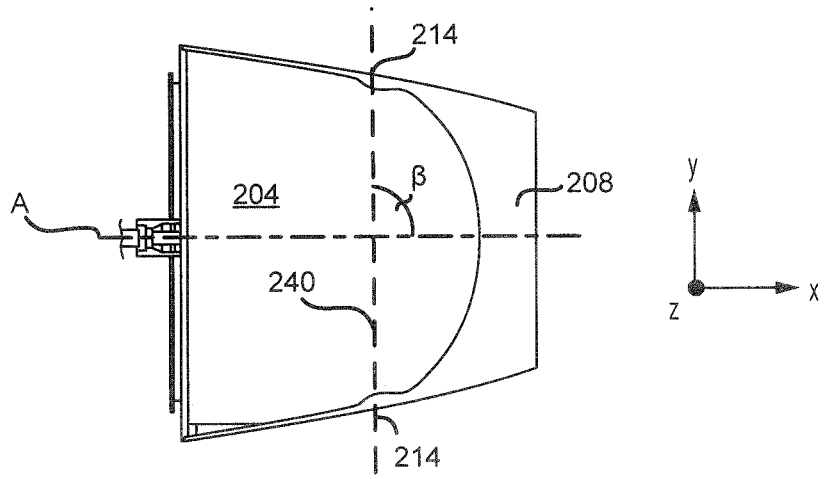
Figure 5C:
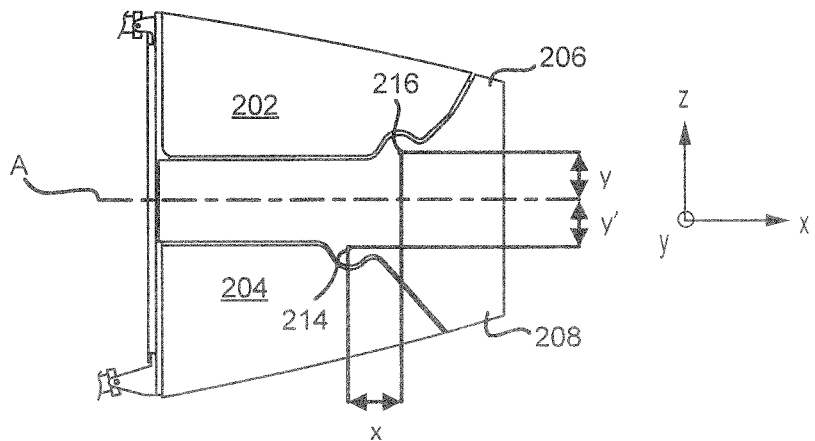

Referring now to FIGS. 5A, 5B, and 5C, thrust reverser 200 is illustrated from a top view, bottom view, and side view, respectively in accordance with various embodiments. As used herein, top view may refer to a direction perpendicular to the x-y plane in the negative z-direction, while bottom view may refer to a direction perpendicular to the x-y plane in the positive z-direction. Side view may refer to a direction perpendicular to the z-x plane in the positive y-direction. With initial reference to FIG. 5A, thrust reverser 200 may comprise an imaginary centerline A extending in an axial direction through a center of thrust reverser 200. Thrust reverser 200 may further comprise an imaginary upper reverser door hinge axis 260 extending through two upper reverser door hinges 216. In various embodiments, upper reverser door hinges 216 and upper reverser door hinge axis 260 may be positioned such that upper reverser door hinges 216 and upper reverser door hinge axis 260 form an angle α relative to centerline A. In various embodiments, α may be between approximately 80 degrees and 100 degrees, between approximately 85 degrees and 95 degrees, or approximately 90 degrees.

Similarly, and with reference now to FIG. 3B, thrust reverser 200 may comprise an imaginary lower reverser door hinge axis 240 extending through both lower reverser door hinges 214. Similar to upper reverser door hinge axis 260, lower reverser door hinge axis 240 (and lower reverser door hinges 214) may form an angle β relative to centerline A. In various embodiments, β may be between approximately 80 degrees and 100 degrees, between approximately 85 degrees and 95 degrees, or approximately 90 degrees. In various embodiments, α and β may be configured such that they are not equal. Stated otherwise, upper reverser door hinge axis 260 and lower reverser door hinge axis 240 are be configured such that they are not parallel to each other viewed from a top or bottom of thrust reverser 200. Such a configuration allows upper reverser door 202 and lower reverser door 204 to be positioned such that portions of upper reverser door 202 and lower reverser door 204 do not interfere when thrust reverser 200 is in a deployed configuration.

Referring now to FIG. 5C, thrust reverser 200 is illustrated from a side view, in accordance with various embodiments. Upper reverser door hinges 216 may be offset from centerline A by a distance, y. Likewise, lower reverser door hinges 214 may be offset from centerline A by a distance, y'. In various embodiments, y and y' may be measured radially outward (along the y-axis) from centerline A. In various embodiments, y and y' may be approximately equal, however, y and y' are not limited in this regard and may comprise different distances. For example, in various embodiments, y may be greater than or less than y'. A distance, x may separate upper reverser door hinges 216 and lower reverser door hinges 214 in an axial direction. While in relation to FIG. 5C, upper reverser door is illustrated aft of lower reverser door hinges 214, thrust reverser 200 is not limited in this regard and lower reverser door hinges 214 may be aft of upper reverser door hinges 216. In various embodiments, y and y' may be approximately equal. Together, x, y, y' along with a and 13 may help to ensure that upper reverser door 202 and lower reverser door 204 are able to properly mesh in the deployed configuration without interference, thereby reducing thrust vectoring and increasing reverse thrust efficiency of thrust reverser 200.

Figure 6:
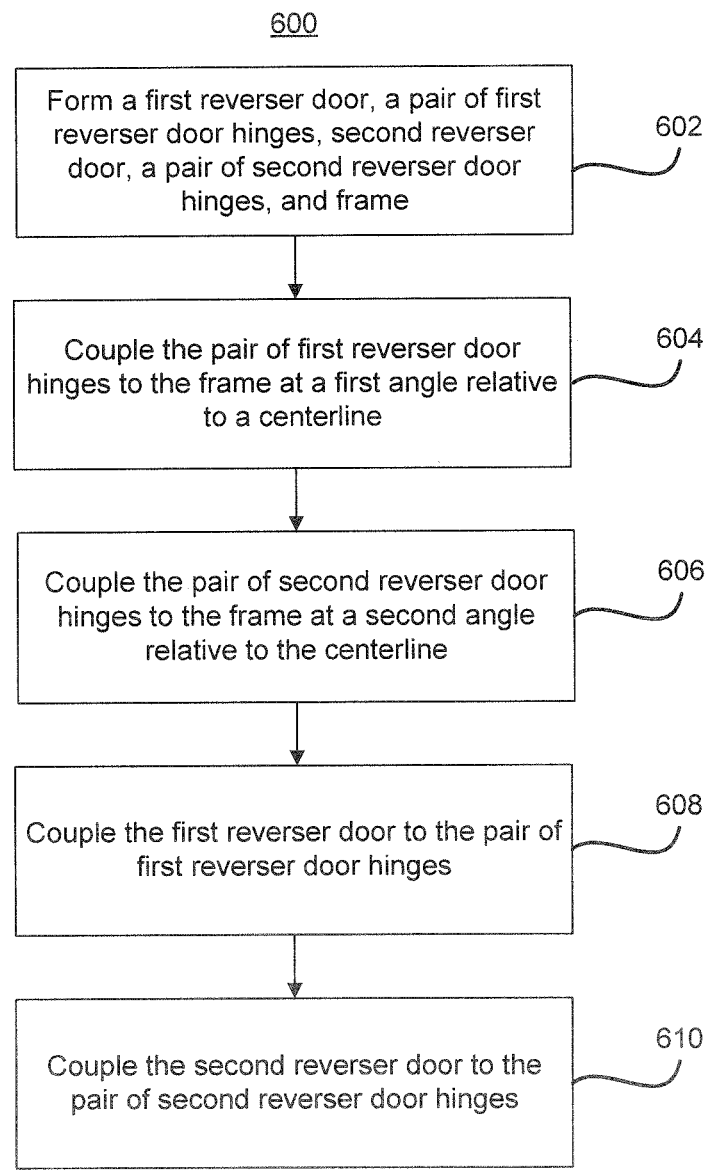
FIG. 6 illustrates a method of manufacturing a thrust reverser assembly, in accordance with various embodiments.

A block diagram illustrating a method 600 for manufacturing a thrust reverser is illustrated in FIG. 6, in accordance with various embodiments. Method 600 may comprise forming an upper reverser door, an upper reverser door hinge, lower reverser door, lower reverser door hinge, and frame (step 602). Method 600 may further comprise coupling the upper reverser door hinge to the frame at a first angle relative to a centerline (step 604). Method 600 may further comprise coupling the lower reverser door hinge to the frame at a second angle relative to the centerline (step 606). Method 600 may further comprise coupling the upper reverser door to the upper reverser door hinge (step 608). Coupling the upper reverser door hinge to the frame may comprise offsetting the upper reverser door hinge a first distance from the centerline. Method 600 may further comprise coupling the lower reverser door to the lower reverser door hinge (Step 610). In various embodiments, coupling the lower reverser door hinge to the frame may comprise offsetting the lower reverser door hinge a second distance from the centerline, the second distance equal to the first distance.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and computer-readable media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser, comprising:
a stationary structure defining an annular body with a centerline, wherein the centerline extends in an x dimension;
a first reverser door pivotally coupled to the stationary structure by a pair of first reverser door hinges, a first reverser door hinge axis extending through the pair of first reverser door hinges and positioned at a first angle relative to the centerline; and
a second reverser door pivotally coupled to the stationary structure by a pair of second reverser door hinges, a second reverser door hinge axis extending through the pair of second reverser door hinges and positioned at a second angle relative to the centerline;
wherein the first angle and second angle are of different magnitudes;
wherein the first reverser door and the second reverser door are oppositely disposed in a z dimension that is orthogonal to the x dimension;
wherein the first reverser door is the only reverser door disposed on a first side of the centerline in the z dimension and the second reverser door is the only reverser door disposed on an opposite second side of the centerline in the z dimension;
wherein an exterior perimeter of the thrust reverser comprises the stationary structure, the first reverser door when in a first closed position, and the second reverser door when in a second closed position.

2. The thrust reverser of claim 1, wherein the pair of first reverser door hinges and the pair of second reverser door hinges are offset in an opposite direction and an equal distance from the centerline.

3. The thrust reverser of claim 1, wherein the pair of first reverser door hinges and the pair of second reverser door hinges are offset from the centerline in opposite directions, the pair of first reverser door hinges offset from the centerline by a first distance and the pair of second reverser door hinges offset from the centerline by a second distance.

4. The thrust reverser of claim 1, wherein the first reverser door comprises a first aft section that is recessed relative to a first forward section of the first reverser door and in a direction of the centerline, and wherein the second reverser door comprises a second aft section that is recessed relative to a second forward section of the second reverser door and in the direction of the centerline.

5. The thrust reverser of claim 4, wherein the first aft section of the first reverser door is disposed under an aft section of the stationary structure when the first reverser door is in the first closed position, and wherein the second aft section of the second reverser door is disposed under the aft section of the stationary structure when the second reverser door is in the second closed position.

6. The thrust reverser of claim 1, wherein the first reverser door hinge axis is disposed within a first reference plane that is parallel to the centerline, and wherein the second reverser door hinge axis is disposed within a second reference plane that is parallel to both the centerline and the first reference plane.

7. The thrust reverser of claim 1, wherein the first angle and the second angle are each between approximately 85 and 95 degrees.

8. The thrust reverser of claim 1, wherein an aft end of the first thrust reverser door is spaced from an aft end of the second thrust reverser door when the thrust reverser is in a deployed configuration.

9. The thrust reverser of claim 1, further comprising a first actuator coupled to a frame and the first reverser door and a second actuator coupled to the frame and the second reverser door, wherein the first actuator and second actuator are configured to extend to position the thrust reverser in a deployed configuration and configured to retract to position the thrust reverser in a stowed configuration.

10. A thrust reverser, comprising:
a frame;
a first reverser door being rotatable relative to the frame; and a second reverser door being rotatable relative to the frame;

wherein the first reverser door rotates about a first reverser door hinge axis angled at a first angle with respect to a centerline of the thrust reverser and the second reverser door rotates about a second reverser door hinge axis angled at a second angle with respect to the centerline of the thrust reverser, the first angle being greater than the second angle, the centerline of the thrust reverser extending in an x dimension;

wherein the first reverser door and the second reverser door are oppositely disposed in a z dimension that is orthogonal to the x dimension;

wherein the first reverser door is the only reverser door disposed on a first side of the centerline in the z dimension and the second reverser door is the only reverser door disposed on an opposite second side of the centerline in the z dimension;

wherein an exterior perimeter of the thrust reverser comprises the first reverser door when in a first closed position and the second reverser door when in a second closed position.

11. The thrust reverser of claim 10, wherein the first reverser door comprises a first aft section that is recessed relative to a first forward section of the first reverser door and in a direction of the centerline, and wherein the second reverser door comprises a second aft section that is recessed relative to a second forward section of the second reverser door and in the direction of the centerline.

12. The thrust reverser of claim 11, further comprising a stationary structure, wherein the exterior perimeter of the thrust reverser further comprises the stationary structure, wherein the first aft section of the first reverser door is disposed under an aft section of the stationary structure when the first reverser door is in the first closed position, and wherein the second aft section of the second reverser door is disposed under the aft section of the stationary structure when the second reverser door is in the second closed position.

13. The thrust reverser of claim 12, further comprising a first plane and a second plane, the first plane extending through a length of the first reverser door hinge axis, the first plane being offset from the centerline by a first distance, the second plane extending through a length of the second reverser door hinge axis, the second plane being offset from the centerline by a second distance.

14. The thrust reverser of claim 13, wherein the first plane and the second plane are parallel.

15. The thrust reverser of claim 13, wherein the first distance and the second distance are equal.

16. The thrust reverser of claim 10, wherein the first reverser door hinge axis is positioned axially aft of the second reverser door hinge axis.

17. The thrust reverser of claim 10, wherein the second reverser door hinge axis is positioned axially aft of the first reverser door hinge axis.

18. A method of manufacturing a thrust reverser, the method comprising:
    forming a first reverser door, a pair of first reverser door hinges, a second reverser door, a pair of second reverser door hinges, and a frame;
    coupling the pair of first reverser door hinges to the frame at a first angle relative to a centerline, the centerline extending in an x dimension;
    coupling the pair of second reverser door hinges to the frame at a second angle relative to the centerline;
    coupling the first reverser door to the pair of first reverser door hinges; and
    coupling the second reverser door to the pair of second reverser door hinges;
    wherein the first angle and second angle are of different magnitudes;
    wherein the first reverser door and the second reverser door are oppositely disposed in a z dimension that is orthogonal to the x dimension;
    wherein the first reverser door is the only reverser door disposed on a first side of the centerline in the z dimension and the second reverser door is the only reverser door disposed on an opposite second side of the centerline in the z dimension;
    wherein an exterior perimeter of the thrust reverser comprises the first reverser door when in a first closed position and the second reverser door when in a second closed position.

19. The method of claim 18, wherein forming the first reverser door comprises forming an first aft section of the first reverser door that is recessed relative to a first forward section of the first reverser door and in a direction of the centerline, and wherein forming the second reverser door comprises forming a second aft section of the second reverser door that is recessed relative to a second forward section of the second reverser door and in the direction of the centerline.

20. The method of claim 19, further comprising forming a stationary section, wherein the first aft section of the first reverser door is disposed under an aft section of the stationary structure when the first reverser door is in the first closed position, and wherein the second aft section of the second reverser door is disposed under the aft section of the stationary structure when the second reverser door is in the second closed position.

* * * * *

UNITED STATES PATENT AND TRADEMARK OFFICE
CERTIFICATE OF CORRECTION

| | |
|---|---|
| PATENT NO. | : 11,286,879 B2 |
| APPLICATION NO. | : 16/025239 |
| DATED | : March 29, 2022 |
| INVENTOR(S) | : Timothy Gormley |

It is certified that error appears in the above-identified patent and that said Letters Patent is hereby corrected as shown below:

On the Title Page

Item (54) and in the Specification, Column 1, Lines 1-2, please delete the word "WIT H" and insert the word --WITH--

Signed and Sealed this
Twelfth Day of July, 2022

Katherine Kelly Vidal
*Director of the United States Patent and Trademark Office*